United States Patent [19]
Kimura

[11] 4,368,953
[45] Jan. 18, 1983

[54] ZOOM LENS SYSTEM

[75] Inventor: Tadashi Kimura, Tokyo, Japan

[73] Assignee: Olympus Optical Co., Ltd., Tokyo, Japan

[21] Appl. No.: 166,683

[22] Filed: Jul. 7, 1980

[30] Foreign Application Priority Data

Jul. 12, 1979 [JP] Japan .................. 54-88429

[51] Int. Cl.³ ............................................. G02B 15/16
[52] U.S. Cl. ................................................. 350/426
[58] Field of Search ..................................... 350/426

[56] References Cited

U.S. PATENT DOCUMENTS

| | | | |
|---|---|---|---|
| 4,142,779 | 3/1979 | Ogawa | 350/426 |
| 4,159,165 | 6/1979 | Betensky et al. | 350/426 |
| 4,169,660 | 10/1979 | Nakamura | 350/426 |

FOREIGN PATENT DOCUMENTS

53-2758688 7/1978 Japan ..................... 350/426

*Primary Examiner*—John K. Corbin
*Assistant Examiner*—Rebecca D. Gass
*Attorney, Agent, or Firm*—Cushman, Darby & Cushman

[57] ABSTRACT

A zoom lens system comprising a front lens group consisting of a first positive lens component, a second negative meniscus lens component, a third negative lens component and a fourth positive lens component, and a rear lens group consisting of a fifth positive lens component, a sixth positive lens component, a seventh negative lens component and an eighth positive lens component. Said zoom lens system is so adapted as to perform zooming operation by varying the airspace reserved between said front and rear lens groups, and has sufficient wide-angle effect and a large zooming ratio in addition to aberrations corrected with good balance.

9 Claims, 22 Drawing Figures

FIG. 3A
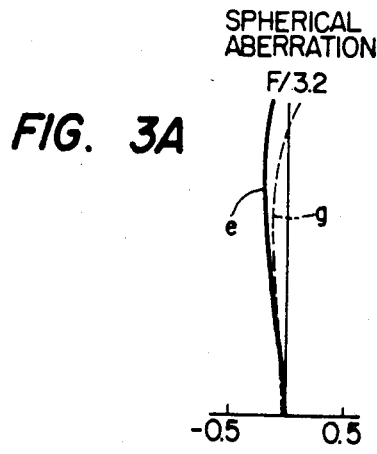
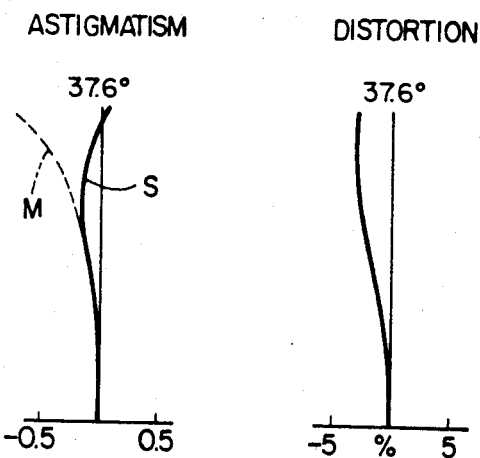
FIG. 3B
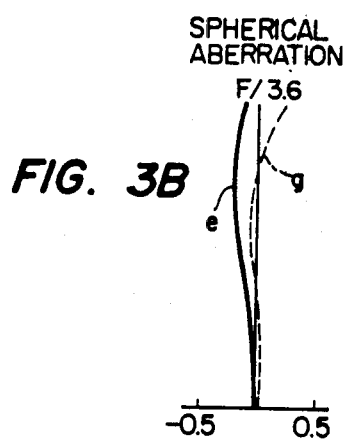
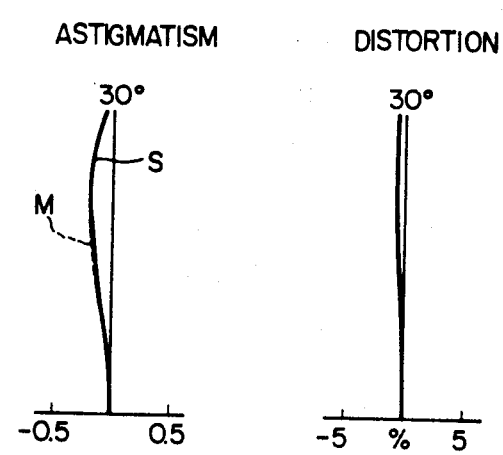
FIG. 3C
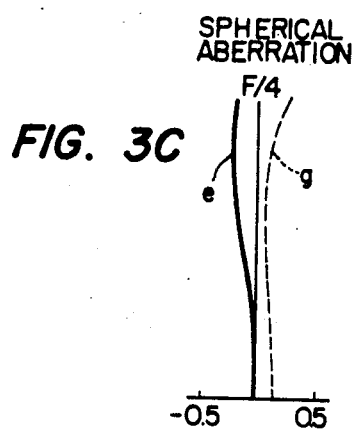
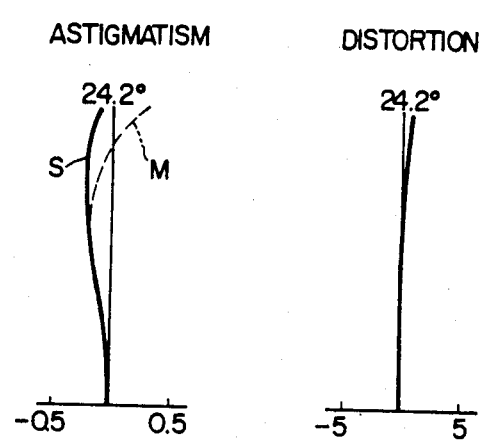

FIG. 5A
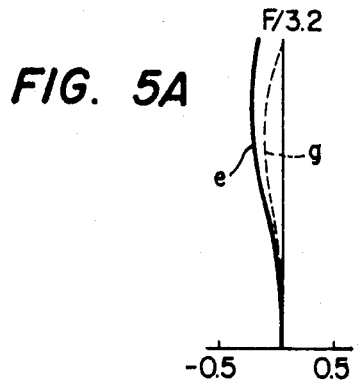
SPHERICAL ABERRATION
F/3.2
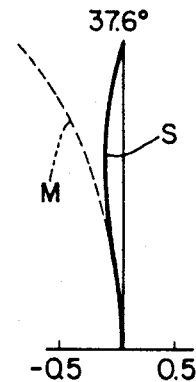
ASTIGMATISM
37.6°
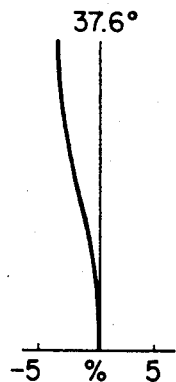
DISTORTION
37.6°
FIG. 5B
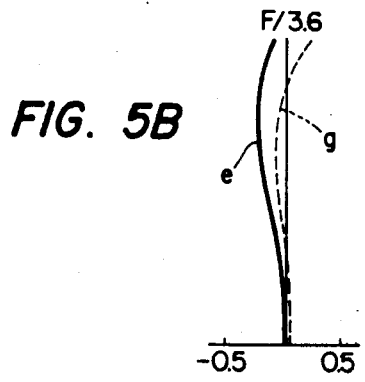
SPHERICAL ABERRATION
F/3.6
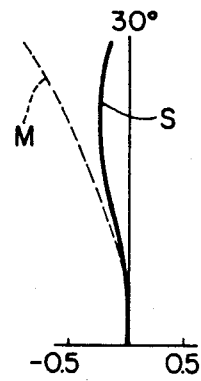
ASTIGMATISM
30°
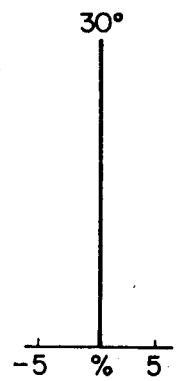
DISTORTION
30°
FIG. 5C
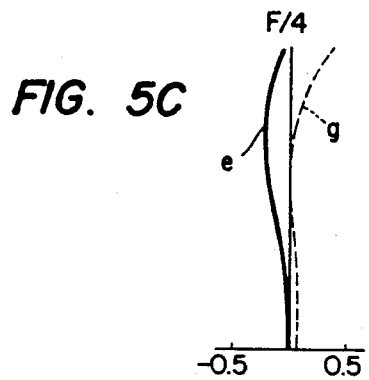
SPHERICAL ABERRATION
F/4
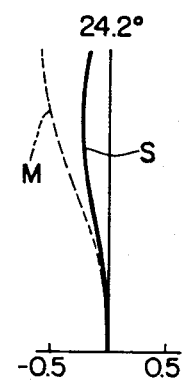
ASTIGMATISM
24.2°
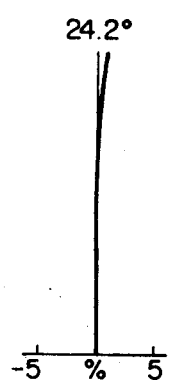
DISTORTION
24.2°

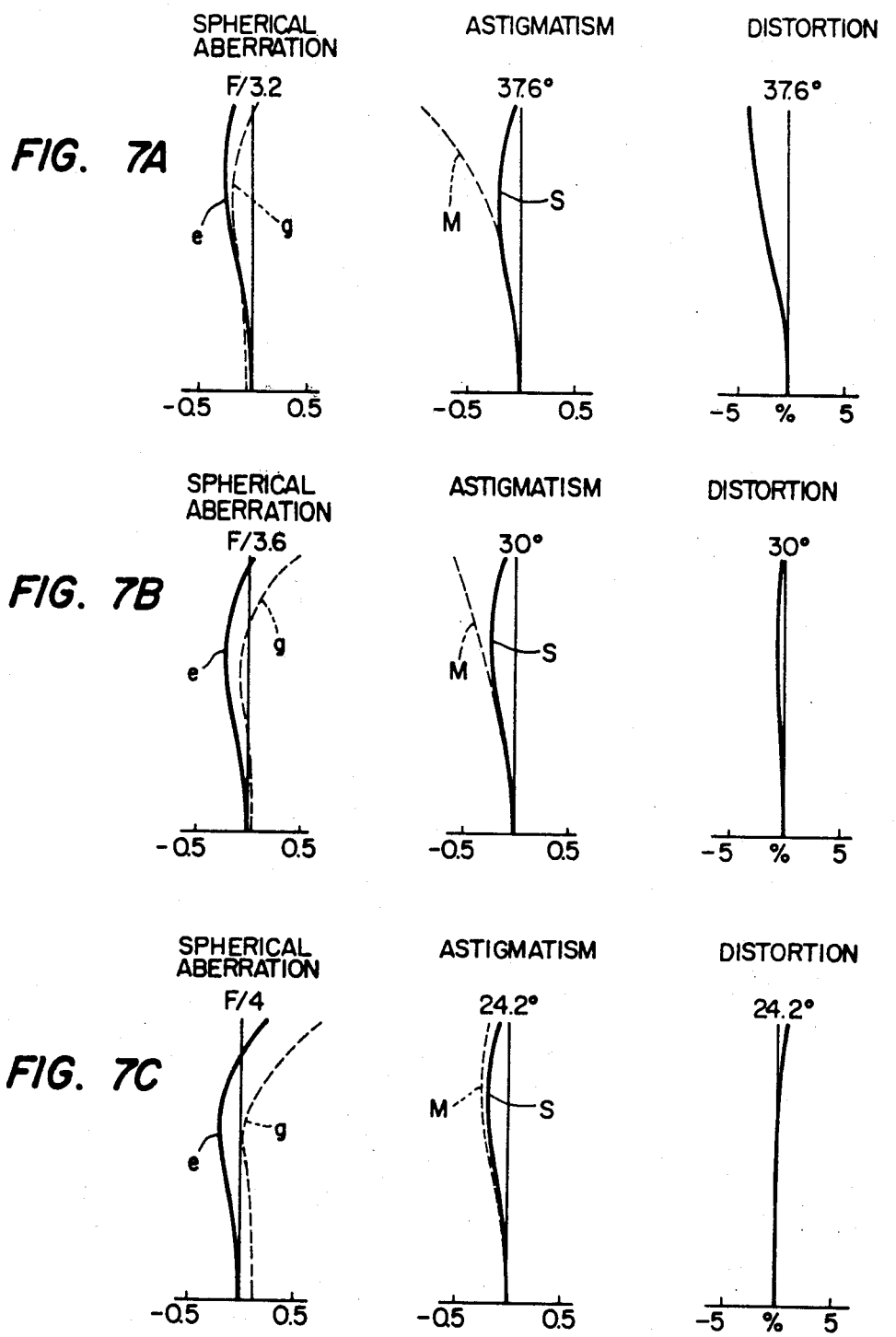

ZOOM LENS SYSTEM

BACKGROUND OF THE INVENTION (a) Field of the Invention

The present invention relates to a zoom lens system which is compact, light in weight and has sufficient wide-angle effect as well as zooming effect.

(b) Description of the Prior Art

There has conventionally been known zoom lens systems having a simple composition consisting of a front lens group and a rear lens group, for example, those disclosed by Japanese published unexamined patent application No. 83543/76 and Japanese published unexamined patent application No. 60246/78. Out of these zoom lens systems, the former is designed for an aperture ratio of F/2.8 and a zooming ratio of 1.9 which assure sufficient brightness and zooming effect but cannot provide sufficient wide-angle effect due to a field angle of $2\omega = 64.6°$ at the wide position. The latter is designed for an aperture ratio of F/3.5, a zooming ratio of 1.67 to 1.85 and a field angle $2\omega = 52°$ to 54°, but cannot provide sufficient wide-angle effect either.

SUMMARY OF THE INVENTION

A general object of the present invention is to provide a zoom lens system which has a simple composition consisting of two lens groups, is designed for half field angle $\omega$ of 37.6° to 24.2° providing sufficient wide-angle effect at the wide position and a zooming ratio of 1.71 assuring sufficient zooming effect, has aberrations corrected with good balance, and provides sufficient quantity of offaxial marginal rays. In a wide-angle zoom lens system, spherical aberration at the tele position, astigmatism at the wide position and variation of distortion pose problems when F number is kept constant during zooming operation, whereas astigmatism at the wide position, and spherical aberration as well as distortion at all positions from wide to tele position pose problems when F number is made variable to keep stop diameter constant. The zoom lens system according to the present invention is of the latter type which is so designed as not only to balance image plane optimum for spherical aberration with that for astigmatism in order to balance paraxial aberration with offaxial aberration but also match the image plane optimum for offaxial aberrations including coma with the image plane optimum for paraxial aberrations both at full aperture and narrow aperture in the stop-down condition. In contrast to the zoom lens systems such as those disclosed by the abovementioned Japanese patent applications most of which adopt a front lens group consisting of three lens components, the zoom lens system according to the present invention uses an additional convex lens component in the front lens group in order to adequately adjust distortion which is apt to have too high a negative value in the front lens group so as to properly control variation of distortion relative to variation of field angle. Variations of distortion, astigmatism, lateral chromatic aberration, coma, etc. relative to variation of field angle are controlled to minimum levels respectively in the front lens group, and absolute values of spherical aberration and other aberrations are controlled to adequate levels in the rear lens group.

The zoom lens system according to the present invention comprises, as shown in FIG. 1, a front lens group consisting of a first positive lens component, a second negative meniscus lens component having a convex surface on the object side, a third negative lens component and a fourth positive lens component, and a rear lens group consisting of a fifth positive lens component, a sixth positive lens component, a seventh negative lens component and an eighth positive lens component, said lens system being so adapted as to perform zooming by displacing said front and rear lens groups. The object of the present invention is accomplished by designing said zoom lens system so as to satisfy the following conditions:

$$1.8 < r_1/|f_F| < 3.5 \quad (1)$$
$$1.8 < r_3/|f_F| < 4.5 \quad (2)$$

$$0.03 < \frac{1}{n_1} - \left(\frac{1}{n_2} + \frac{1}{n_3}\right)/2 \quad (3)$$

$$1.75 < n_7 \quad (4)$$
$$50 < (\nu_2 + \nu_3)/2 \quad (5)$$
$$0.18 < (d_3 + d_4 + d_5)/|f_F| < 0.3 \quad (6)$$

wherein the reference symbol $f_F$ represents focal length of the front lens group, the reference symbols $r_1$ and $r_3$ designate radii of curvature on the object side surface of the first lens component and on the object side surface of the second lens component respectively, the reference symbols $d_3$ and $d_5$ denote thicknesses of the second and third lens components respectively, the reference symbol $d_4$ represents airspace reserved between the second and third lens component, the reference symbols $n_1$, $n_2$, $n_3$ and $n_7$ designate refractive indices of the first, second, third and seventh lens components respectively, and the reference symbols $\nu_2$ and $\nu_3$ denote Abbe's numbers of the second and third lens components respectively. Out of the above-mentioned conditions, the conditions (1) and (2) have been defined for controlling variation of astigmatism to a minimum level at both the wide and tele positions, and balancing aberrations at all the focal lengths.

If $r_1/|f_F|$ is larger then 3.5 in the condition (1), difference in the meridional astigmatism between the wide position and tele position will be large, thereby causing undesirable effect. If $r_1/|f_F|$ is smaller than 1.8, in contrast, spherical aberration will be aggravated and, when it is attempted to correct the spherical aberration by bendings on the other lens surfaces, offaxial coma will be aggravated to cause undesirable effect.

Similarly, if $r_3/|f_F|$ is larger than 4.5 in the condition (2), difference in the meridional astigmatism between the wide position and tele position will be large. If $r_3/|f_F|$ is smaller than 1.8, spherical aberration will be aggravated and, if it is attempted to correct the spherical aberration by bendings on the other lens surfaces, offaxial coma will be aggravated.

The conditions (3) and (4) are required for preventing Petzval's sum from becoming smaller than necessary due to the fact that the negative lens components have powers higher than those of the positive lens components in the entire zoom lens system when field angle is enlarged (approximately 38°) at the wide position in a zoom lens system consisting of two lens groups. Though it is generally said that curvature of field and astigmatic difference are reduced at a smaller Petzval's sum, balance between the paraxial aberration and offaxial aberration poses a problem when it is desired to obtain a flat high quality image over the entire field in a lens system consisting of a small number of lens components. Especially in case where aberrations are apt to change depending on variation of focal length as is the case of a zoom lens system, not only variation of astigmatism due to difference in field angle but also balance among aberrations including those at full aperture and at narrow aperture in the stop down condition poses problems. It is required not only to favorably correct aberration including spherical aberration and offaxial aberration in a certain condition but also to maintain desirable lens performance in other conditions. From such a standpoint, it is not advantageous to correct only one type of aberration almost ideally in a single condition in order to correct all types of aberrations with good balance in all conditions. Therefore, the best solution is not to obtain spherical aberration, Petzval's sum and other aberrations as low as possible, but to correct all the aberrations with good balance within allowable ranges. From this viewpoint, the zoom lens system according to the present invention has been so designed as to prevent Petzval's sum from being minimized excessively.

If $1/n_1 - (1/n_2 + 1/n_3)/2$ is smaller than 0.03 in the condition (3), Petzval's sum is too small, thereby aggravating curvature of field and astigmatic difference cannot be corrected with good balance, thereby degrading image quality. In addition, if $1/n_1 - (1/n_2 + 1/n_3)/2$ is 0.1 to 0.15, it will be difficult to select a glass material which can satisfy this condition and Petzval's sum will be large enough to produce curvature of field and astigmatic difference. Therefore, $1/n_1 - (1/n_2 + 1/n_3)/2$ should preferably be smaller than 0.15.

The condition (4) is required for a purpose similar to that of the condition (3). If $n_7$ is smaller than 1.75, Petzval's sum will be small enough to make it impossible to correct curvature of field and astigmatic difference with good balance, thereby degrading image quality. Though $n_7$ should desirably have a value as large as possible from theoretical viewpoint, it will be selected within a range of $n_7 < 1.9$ taking practically usable materials into consideration.

If $(\nu_2 + \nu_3)/2$ is smaller than 50 in the condition (5), paraxial chromatic aberration, lateral chromatic aberration and chromatic aberration of coma will largely vary when the zoom lens system is displaced from the wide position to the tele position, thereby making it impossible to correct the chromatic aberrations with good balance. If $(\nu_2 + \nu_3)/2$ exceeds 65 in the condition (5), it will be difficult to obtain a glass material having a refractive index which can satisfy the condition (3), and $(\nu_2 + \nu_3)/2$ should practically be smaller than 65. Theoretically speaking, however, the above-mentioned effect can be obtained when $(\nu_2 + \nu_3)/2$ has a value larger than 65.

If $(d_2 + d_4 + d_5)/|f_F|$ is larger than 0.3 in the condition (6), the front lens group will have not only a long total length but a long back focal length, making it impossible to obtain a sufficient zooming ratio. If it is attempted to correct these defects by bending on the respective lens surfaces, $f_F$ or radius of curvature on the image side surface of the fourth lens component will be too small, resulting in undesirable effect for correcting aberrations. If $(d_3 + d_4 + d_5)/|f_F|$ is smaller than 0.18, in contrast, the front lens group will have a short back focal length and the entire zoom lens system will have a long total length. In order to shorten the total length of the entire zoom lens system, it will be required to change imaging magnification of the rear lens group, but such a measure will be undesirable for correcting aberrations.

Further, attempt to obtain sufficient quantity of offaxial marginal rays will undesirably enlarge diameter of the front lens group.

A lens system having the above-described composition and satisfying the conditions (1) through (6) can accomplish the object of the present invention. However, such a lens system can be more excellent zoom lens system when it is so designed as to satisfy the following additional conditions (7) through (9).

$$1.68 < n_4 \quad (7)$$
$$3 < |r_8|/|f_F| \quad (8)$$
$$0.35 < (d_9 + d_{13})/f_R < 0.5 \quad (9)$$

wherein the reference symbol $r_8$ represents radius of curvature on the image side surface of the fourth lens component, the reference symbols $d_9$ and $d_{13}$ designate thicknesses of the fifth and seventh lens components respectively, the reference symbol $n_4$ denotes refractive index of the fourth lens component and the reference symbol $f_R$ represents focal length of the rear lens group.

If $n_4$ is larger than 1.68 in the condition (7) out of the above-mentioned conditions, Petzval's sum will be large enough to be desirable for correcting offaxial astigmatism, but it will be obliged to select small radii of curvature $r_7$ and $r_8$ on both the surfaces of the fourth lens component, which will in turn aggravate spherical aberration. If it is attempted to correct the spherical aberration by bendings on the other lens surfaces, offaxial coma will be aggravated, resulting in undesirable effect. In addition, since no glass material having $n_4$ higher than 1.9 is practically utilizable, upper limit of $n_4$ will be on the order of 1.9 though $n_4$ can have a larger value from theoretical viewpoint.

If $|r_8|/|f_F|$ is smaller than 3 in the condition (8), the front lens group will have a long back focal length, thereby making it impossible to obtain a sufficient zooming ratio. If it is attempted to correct it by bendings on the other lens surfaces, $r_2$, $r_4$ and $|r_5|$ will have small values which are undesirable for correcting aberrations. If $(d_9 + d_{13})/f_R$ is larger than 0.5 in the conditon (9), coma and lateral chromatic aberrations will be corrected favorably, but total length of the zoom lens system as a whole will be undesirably prolonged. If $(d_9 + d_{13})/f_R$ is smaller than 0.35, in contrast, coma and lateral chromatic aberration will be aggravated at the wide position, making it impossible to obtain sufficient zooming ratio and favorable lens performance.

Moreover, the zoom lens system according to the present invention can be still more excellent when it is so designed as to satisfy the following conditions (10) and (11).

$$0.55 < |r_{16}|/f_R < 0.85 \quad (10)$$
$$1.6 < (n_5 + n_6 + n_8)/3 < 1.7 \quad (11)$$

wherein the reference symbol $r_{16}$ represents radius of curvature on the image side surface of the eighth lens component, and the reference symbols $n_5$, $n_6$ and $n_8$ designate refractive indices of the fifth, sixth and eighth lens components respectively.

If $|r_{16}|/f_R$ is larger than 0.85 in the condition (10), the rear lens group will have a long back focal length, thereby making it impossible to obtain a sufficiently magnified image at the tele position. In order to shorten the back focal length of the rear lens group, it is required to change imaging magnification of the rear lens group, but such a change will increase variation of the airspace $d_8$ reserved between the front and rear lens groups, resulting in undesirable effect. If $|r_{16}|/f_R$ is smaller than 0.55, in contrast, the rear lens group will have a short back focal length and the entire zoom lens system as a whole will also have a short back focal length at the wide position, resulting in undesirable effect. In order to prolong the back focal length, it will be required to change the imaging magnification of the rear lens system so as to enlarge the value of $f_R$, which will in turn undesirably prolong total length of the zoom lens system as a whole.

If $(n_5+n_6+n_8)/3$ is larger than 1.7 in the condition (11), Petzval's sum will be too small to correct curvature of field and astigmatic difference with good balance, thereby degrading image quality. If $(n_5+n_6+n_8)/3$ is smaller than the lower limit of 1.6, in contrast, spherical aberration will be aggravated in the rear lens group and, if it is attempted to correct the spherical aberration by bendings on the respective lens surfaces in the rear lens group, coma and astigmatism will be aggravated.

BRIEF DESCRIPTION OF THE DRAWINGS

FIG. 3A, FIG. 3B and FIG. 3C show curves illustrating the aberration characteristics of a second embodiment of the present invention;

FIG. 5A, FIG. 5B and FIG. 5C show curves illustrating the aberration characteristics of a fourth embodiment of the present invention;

FIG. 7A, FIG. 7B and FIG. 7C show curves illustrating the aberration characteristics of a sixth embodiment of the present invention.

DETAILED DESCRIPTION OF THE PREFERRED EMBODIMENTS

Figure 1:
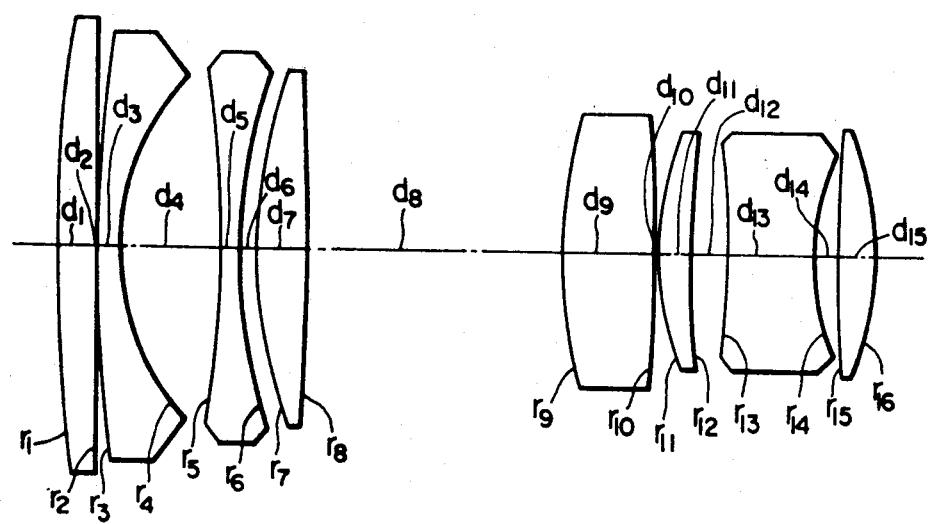
FIG. 1 shows a sectional view illustrating the composition of the zoom lens system according to the present invention.

Now, numerical data will be described below as preferred embodiments of the zoom lens system according to the present invention.

Embodiment 1

$r_1 = 127.858$
$d_1 = 2.89$, $n_1 = 1.51825$, $v_1 = 64.15$
$r_2 = -5305.436$
$d_2 = 0.10$
$r_3 = 133.964$
$d_3 = 1.40$, $n_2 = 1.64129$, $v_2 = 55.38$
$r_4 = 19.583$
$d_4 = 8.06$
$r_5 = -106.781$
$d_5 = 2.45$, $n_3 = 1.60548$, $v_3 = 60.70$
$r_6 = 43.081$
$d_6 = 2.68$

Embodiment 1 —continued $r_7 = 37.460$
$d_7 = 3.90$, $n_4 = 1.81077$, $v_4 = 40.95$
$r_8 = 361.218$
$d_8 = 1.04 \sim 23.69$
$r_9 = 39.590$
$d_9 = 8.40$, $n_5 = 1.73234$, $v_5 = 54.68$
$r_{10} = -187.882$
$d_{10} = 0.40$
$r_{11} = 25.160$
$d_{11} = 3.03$, $n_6 = 1.61770$, $v_5 = 51.17$
$r_{12} = -797.384$
$d_{12} = 3.01$
$r_{13} = -46.421$
$d_{13} = 7.62$, $n_7 = 1.81265$, $v_7 = 25.43$
$r_{14} = 22.055$
$d_{14} = 1.50$
$r_{15} = 139.658$
$d_{15} = 3.14$, $n_8 = 1.67133$, $v_8 = 41.93$
$r_{16} = -24.057$
$f = 28.09 \sim 48.06$, $\omega = 37.6° \sim 24.2°$
$f_F = -47.368$, $f_R = 34.295$
$r_1/|f_F| = 2.699$, $r_3/|f_F| = 2.828$ $$\frac{1}{n_1} - \left(\frac{1}{n_2} + \frac{1}{n_3}\right)/2 = 0.0426$$

$(v_2 + v_3)/2 = 58.04$, $(d_3 + d_4 + d_5)/|f_F| = 0.251$
$|r_8|/|f_F| = 7.626$, $(d_9 + d_{13})/f_R = 0.467$
$r_{16}/|f_R| = 0.702$, $(n_5 + n_6 + n_8)/3 = 1.67379$

Embodiment 2

$r_1 = 113.512$
$d_1 = 3.50$, $n_1 = 1.51825$, $v_1 = 64.15$
$r_2 = \infty$
$d_2 = 0.10$
$r_3 = 95.689$
$d_3 = 1.46$, $n_2 = 1.64368$, $v_2 = 56.93$
$r_4 = 17.951$
$d_4 = 8.90$
$r_5 = -70.316$
$d_5 = 1.20$, $n_3 = 1.73234$, $v_3 = 54.68$
$r_6 = 49.671$
$d_6 = 1.63$
$r_7 = 37.333$
$d_7 = 4.50$, $n_4 = 1.80401$, $v_4 = 42.24$
$r_8 = -229.690$
$d_8 = 2.26 \sim 25.34$
$r_9 = 46.763$
$d_9 = 7.16$, $n_5 = 1.61377$, $v_5 = 55.92$
$r_{10} = -57.086$
$d_{10} = 0.40$
$r_{11} = 20.230$
$d_{11} = 2.75$, $n_6 = 1.61770$, $v_5 = 51.17$
$r_{12} = 60.638$
$d_{12} = 2.98$
$r_{13} = -68.403$
$d_{13} = 8.02$, $n_7 = 1.79177$, $v_7 = 26.22$
$r_{14} = 20.304$
$d_{14} = 2.14$
$r_{15} = 100.850$
$d_{15} = 3.47$, $n_8 = 1.64268$, $v_8 = 44.88$
$r_{16} = -25.935$
$f = 28.09 \sim 48.06$, $\omega = 37.6° \sim 24.2°$
$f_F = -46.887$, $f_R = 34.828$
$r_1/|f_F| = 2.421$, $r_3/|f_F| = 2.041$ $$\frac{1}{n_1} - \left(\frac{1}{n_2} + \frac{1}{n_3}\right)/2 = 0.0659, (v_2 + v_3)/2 = 55.81$$

$(d_3 + d_4 + d_5)/|f_F| = 0.247$, $|r_8|/|f_F| = 4.899$
$(d_9 + d_{13})/f_R = 0.436$, $|r_{16}|/f_R = 0.745$
$(n_5 + n_6 + n_8)/3 = 1.62472$

Embodiment 3

| | | |
|---|---|---|
| $r_1 = 100.042$ | | |
| $d_1 = 3.10$ | $n_1 = 1.51825$ | $\nu_1 = 64.15$ |
| $r_2 = 1906.586$ | | |
| $d_2 = 0.10$ | | |
| $r_3 = 108.871$ | | |
| $d_3 = 1.46$ | $n_2 = 1.73234$ | $\nu_2 = 54.68$ |
| $r_4 = 19.330$ | | |
| $d_4 = 8.52$ | | |
| $r_5 = -78.996$ | | |
| $d_5 = 1.20$ | $n_3 = 1.73234$ | $\nu_3 = 54.68$ |
| $r_6 = 52.609$ | | |
| $d_6 = 2.17$ | | |
| $r_7 = 40.258$ | | |
| $d_7 = 4.20$ | $n_4 = 1.81077$ | $\nu_4 = 40.95$ |
| $r_8 = -212.269$ | | |
| $d_8 = 0.19 \sim 24.21$ | | |
| $r_9 = 45.876$ | | |
| $d_9 = 7.79$ | $n_5 = 1.61377$ | $\nu_5 = 55.92$ |
| $r_{10} = -67.744$ | | |
| $d_{10} = 0.41$ | | |
| $r_{11} = 22.403$ | | |
| $d_{11} = 2.59$ | $n_6 = 1.61770$ | $\nu_5 = 51.17$ |
| $r_{12} = 118.006$ | | |
| $d_{12} = 3.23$ | | |
| $r_{13} = -59.260$ | | |
| $d_{13} = 8.49$ | $n_7 = 1.79177$ | $\nu_7 = 26.22$ |
| $r_{14} = 21.536$ | | |
| $d_{14} = 2.16$ | | |
| $r_{15} = 250.069$ | | |
| $d_{15} = 3.23$ | $n_8 = 1.72372$ | $\nu_8 = 46.03$ |
| $r_{16} = -26.092$ | | |
| $f = 28.09 \sim 48.06, \omega = 37.6° \sim 24.2°$ | | |
| $f_F = -46.874, f_R = 35.192$ | | |
| $r_1/|f_F| = 2.134, r_3/|f_F| = 2.323$ | | |

$$\frac{1}{n_1} - \left(\frac{1}{n_2} + \frac{1}{n_3}\right)/2 = 0.0814, (\nu_2 + \nu_3)/2 = 54.68$$

$(d_3 + d_4 + d_5)/|f_F| = 0.238, |r_8|/|f_F| = 4.529$
$(d_9 + d_{13})/f_R = 0.462, |r_{16}|/f_R = 0.741$
$(n_5 + n_6 + n_8)/3 = 1.65173$

Embodiment 4

| | | |
|---|---|---|
| $r_1 = 119.467$ | | |
| $d_1 = 3.00$ | $n_1 = 1.51825$ | $\nu_1 = 64.15$ |
| $r_2 = -1146.097$ | | |
| $d_2 = 0.10$ | | |
| $r_3 = 183.494$ | | |
| $d_3 = 1.48$ | $n_2 = 1.73234$ | $\nu_2 = 54.68$ |
| $r_4 = 19.785$ | | |
| $d_4 = 6.91$ | | |
| $r_5 = -118.630$ | | |
| $d_5 = 1.43$ | $n_3 = 1.64254$ | $\nu_3 = 60.09$ |
| $r_6 = 46.661$ | | |
| $d_6 = 2.42$ | | |
| $r_7 = 37.163$ | | |
| $d_7 = 3.9$ | $n_4 = 1.81077$ | $\nu_4 = 40.95$ |
| $r_8 = -1947.670$ | | |
| $d_8 = 0.54 \sim 23.36$ | | |
| $r_9 = 37.763$ | | |
| $d_9 = 9.18$ | $n_5 = 1.73234$ | $\nu_5 = 54.68$ |
| $r_{10} = -96.398$ | | |
| $d_{10} = 0.40$ | | |
| $r_{11} = 26.130$ | | |
| $d_{11} = 2.69$ | $n_6 = 1.61770$ | $\nu_6 = 51.17$ |
| $r_{12} = -515.202$ | | |
| $d_{12} = 2.39$ | | |
| $r_{13} = -39.463$ | | |
| $d_{13} = 7.33$ | $n_7 = 1.79177$ | $\nu_7 = 26.22$ |
| $r_{14} = 22.145$ | | |
| $d_{14} = 2.10$ | | |
| $r_{15} = -279.593$ | | |
| $d_{15} = 3.14$ | $n_8 = 1.67133$ | $\nu_8 = 41.93$ |
| $r_{16} = -20.941$ | | |
| $f = 28.09 \sim 48.06, \omega = 37.6° \sim 24.2°$ | | |
| $f_F = -47.411, f_R = 34.287$ | | |

Embodiment 4 -continued $r_1/|f_F| = 2.520, r_3/|f_F| = 3.870$ $$\frac{1}{n_1} - \left(\frac{1}{n_2} + \frac{1}{n_3}\right)/2 = 0.0656, (\nu_2 + \nu_3)/2 = 57.39$$

$(d_3 + d_4 + d_5)/|f_F| = 0.207, |r_8|/|f_F| = 41.08$
$(d_9 + d_{13})/f_R = 0.481, |r_{16}|/f_R = 0.611$
$(n_5 + n_6 + n_8)/3 = 1.67379$

Embodiment 5

| | | |
|---|---|---|
| $r_1 = 121.454$ | | |
| $d_1 = 3.50$ | $n_1 = 1.51825$ | $\nu_1 = 64.15$ |
| $r_2 = -861.816$ | | |
| $d_2 = 0.10$ | | |
| $r_3 = 107.246$ | | |
| $d_3 = 1.46$ | $n_2 = 1.64368$ | $\nu_2 = 56.93$ |
| $r_4 = 18.249$ | | |
| $d_4 = 9.42$ | | |
| $r_5 = -70.215$ | | |
| $d_5 = 1.20$ | $n_3 = 1.64368$ | $\nu_3 = 56.93$ |
| $r_6 = 42.396$ | | |
| $d_6 = 1.39$ | | |
| $r_7 = 35.023$ | | |
| $d_7 = 4.50$ | $n_4 = 1.80401$ | $\nu_4 = 42.24$ |
| $r_8 = -496.198$ | | |
| $d_8 = 1.60 \sim 24.60$ | | |
| $r_9 = 46.961$ | | |
| $d_9 = 6.30$ | $n_5 = 1.61377$ | $\nu_5 = 55.92$ |
| $r_{10} = -59.252$ | | |
| $d_{10} = 0.40$ | | |
| $r_{11} = 19.829$ | | |
| $d_{11} = 2.64$ | $n_6 = 1.61770$ | $\nu_5 = 51.17$ |
| $r_{12} = 53.772$ | | |
| $d_{12} = 3.28$ | | |
| $r_{13} = -69.625$ | | |
| $d_{13} = 7.85$ | $n_7 = 1.79177$ | $\nu_7 = 26.22$ |
| $5_{14} = 20.092$ | | |
| $d_{14} = 2.12$ | | |
| $r_{15} = 72.179$ | | |
| $d_{15} = 3.44$ | $n_8 = 1.64268$ | $\nu_8 = 44.88$ |
| $r_{16} = -26.476$ | | |
| $f = 28.09 \sim 48.06, \omega = 37.6 \sim 24.2$ | | |
| $f_F = -46.872, f_R = 34.828$ | | |
| $r_1/|f_F| = 2.591, r_3/|f_F| = 2.288$ | | |

$$\frac{1}{n_1} - \left(\frac{1}{n_2} + \frac{1}{n_3}\right)/2 = 0.0503, (\nu_2 + \nu_3)/2 = 56.93$$

$(d_3 + d_4 + d_5)/|f_F| = 0.258, |r_8|/|f_F| = 10.586$
$(d_9 + d_{13})/f_R = 0.41, |r_6|/f_R = 0.760$
$(n_5 + n_6 + n_8)/3 = 1.62472$

Embodiment 6

| | | |
|---|---|---|
| $r_1 = 144.789$ | | |
| $d_1 = 3.00$ | $n_1 = 1.51825$ | $\nu_1 = 64.15$ |
| $r_2 = -2330.391$ | | |
| $d_2 = 0.10$ | | |
| $r_3 = 110.076$ | | |
| $d_3 = 1.48$ | $n_2 = 1.73234$ | $\nu_2 = 54.68$ |
| $r_4 = 19.245$ | | |
| $d_4 = 7.10$ | | |
| $r_5 = -75.558$ | | |
| $d_5 = 1.90$ | $n_3 = 1.73234$ | $\nu_3 = 54.68$ |
| $r_6 = 105.490$ | | |
| $d_6 = 2.51$ | | |
| $r_7 = 42.547$ | | |
| $d_7 = 3.90$ | $n_4 = 1.70559$ | $\nu_4 = 41.10$ |
| $r_8 = -243.568$ | | |
| $d_8 = 1.79 \sim 23.61$ | | |
| $r_9 = 32.265$ | | |
| $d_9 = 7.97$ | $n_5 = 1.66123$ | $\nu_5 = 53.44$ |

-continued

Embodiment 6

$r_{10} = -66.369$
$d_{10} = 0.40$
$r_{11} = 22.928$
$d_{11} = 2.49$    $n_6 = 1.61770$    $v_6 = 51.17$
$r_{12} = 100.148$
$d_{12} = 2.65$
$r_{13} = -41.462$
$d_{13} = 6.37$    $n_7 = 1.79177$    $v_7 = 26.22$
$r_{14} = 20.801$
$d_{14} = 2.10$
$r_{15} = -262.716$
$d_{15} = 3.14$    $n_8 = 1.67133$    $v_8 = 41.93$
$r_{16} = -20.839$
$f = 28.09 \sim 48.06, \omega = 37.6° \sim 24.2°$
$f_F = -47.368, f_R = 34.294$
$r_1/|f_F| = 3.057, r_3/|f_F| = 2.324$ $$\frac{1}{n_1} - \left(\frac{1}{n_2} + \frac{1}{n_3}\right) /2 = 0.0814, (v_2 + v_3)/2 = 54.68$$

$(d_3 + d_4 + d_5)/|f_F| = 0.221, |r_8|/|f_F| = 5.142$
$(d_9 + d_{13})/f_R = 0.418, |r_{16}|/f_R = 0.608$
$(n_5 + n_6 + n_8)/3 = 1.65009$

Embodiment 7

$r_1 = 105.685$
$d_1 = 3.47$    $n_1 = 1.51825$    $v_1 = 64.15$
$r_2 = 5283.200$
$d_2 = 0.10$
$r_3 = 100.244$
$d_3 = 1.70$    $n_2 = 1.68082$    $v_2 = 55.33$
$r_4 = 17.968$
$d_4 = 8.90$
$r_5 = -64.869$
$d_5 = 1.70$    $n_3 = 1.68082$    $v_3 = 55.33$
$r_6 = 57.540$
$d_6 = 1.28$
$r_7 = 37.798$
$d_7 = 4.44$    $n_4 = 1.80401$    $v_4 = 42.24$
$r_8 = -323.157$
$d_8 = 1.11 \sim 23.56$
$r_9 = 45.023$
$d_9 = 7.79$    $n_5 = 1.61634$    $v_5 = 56.36$
$r_{10} = -60.844$
$d_{10} = 0.39$
$r_{11} = 20.282$
$d_{11} = 2.64$    $n_6 = 1.61022$    $v_6 = 49.29$
$r_{12} = 73.663$
$d_{12} = 3.13$
$r_{13} = -66.564$
$d_{13} = 7.33$    $n_7 = 1.79177$    $v_7 = 26.22$
$r_{14} = 20.131$
$d_{14} = 2.10$
$r_{15} = 126.961$
$d_{15} = 3.37$    $n_8 = 1.68613$    $v_8 = 44.65$
$r_{16} = -26.715$
$f = 28.09 \; 48.06, \omega = 37.6° \sim 24.2°$
$f_F = -46.404, f_R = 34.134$
$r_1/|f_F| = 2.277, r_3/|f_F| = 2.160$ $$\frac{1}{n_1} - \left(\frac{1}{n_2} + \frac{1}{n_3}\right) /2 = 0.0637, (v_2 + v_3)/2 = 55.33$$

$(d_3 + d_4 + d_5)/|f_F| = 0.265, |r_8|/|f_F| = 6.964$
$(d_9 + d_{13})/f_R = 0.443, |r_{16}|/f_R = 0.783$
$(n_5 + n_6 + n_8)/3 = 1.63756$ wherein the reference sybmols $r_1$ through $r_{16}$ represent radii of curvature on the surfaces of the respective lens components, the reference symbols $d_1$ through $d_{15}$ designate thicknesses of the respective lens components and airspaces reserved there between, the reference symbols $n_1$ through $n_8$ denote refractive indices of the respective lens components, the reference symbols $v_1$ through $v_8$ represent Abbe's numbers of the respective lens components, the reference symbol f designates focal length of the entire zoom lens system as a whole, the reference symbol $\omega$ denotes half field angle, the reference symbol $f_F$ represents focal length of the front lens group and the reference symbol $f_R$ designates focal length of the rear lens group.

Figure 2A:
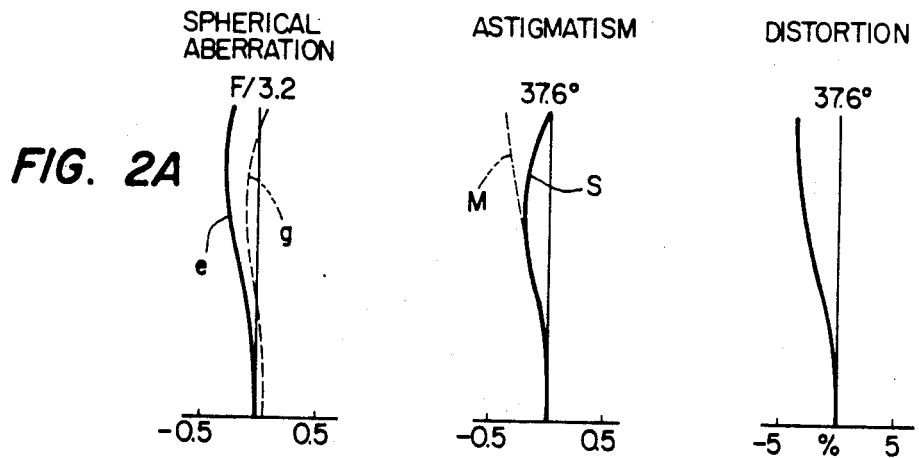
FIG. 2A, FIG. 2B and FIG. 2C show curves illustrating the aberration characteristics of a first embodiment of the present invention.
Figure 2B:
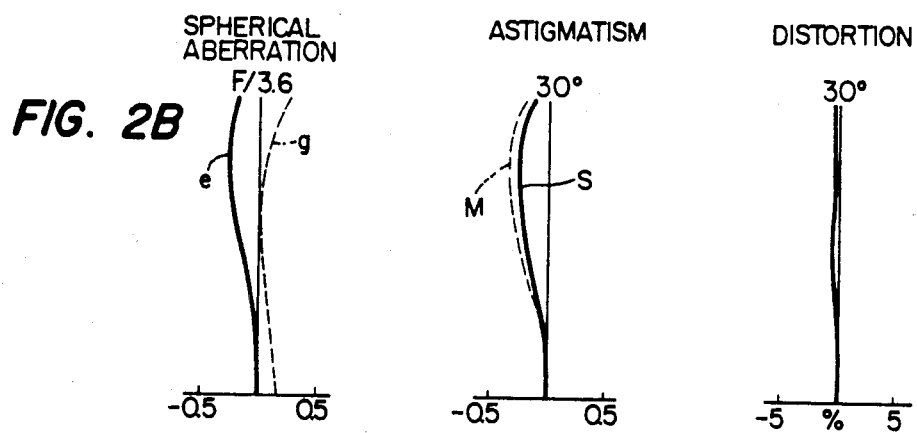
Figure 2C:
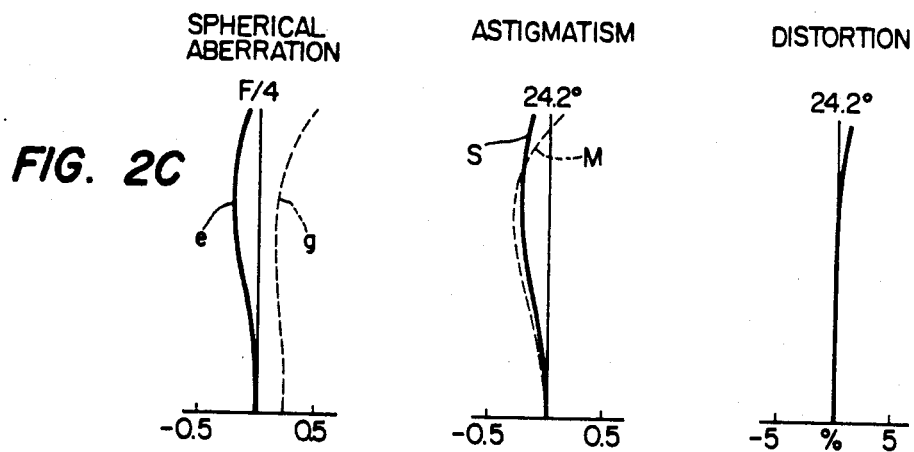
Figure 4A:
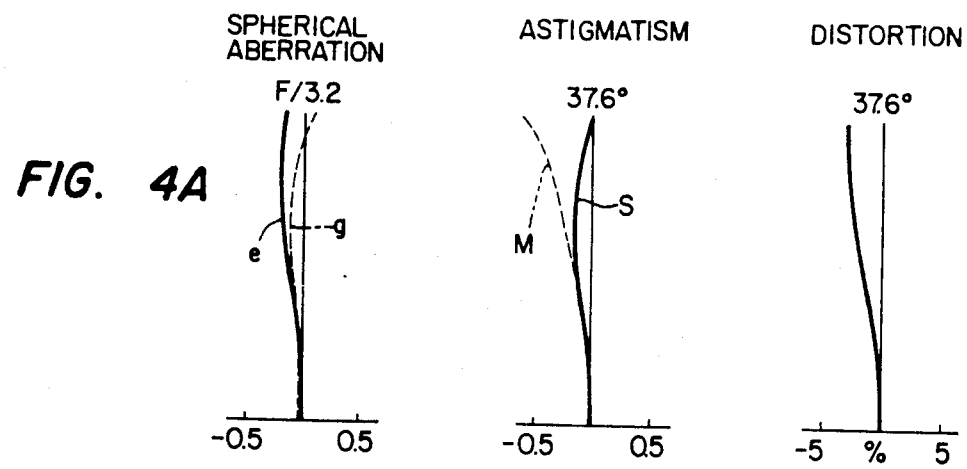
FIG. 4A, FIG. 4B and FIG. 4C show curves illustrating the aberration characteristics of a third embodiment of the present invention.
Figure 4B:
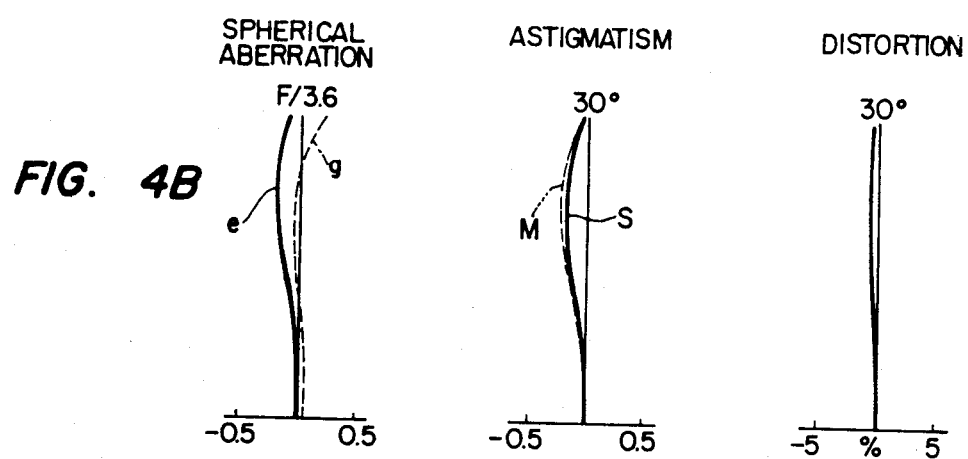
Figure 4C:
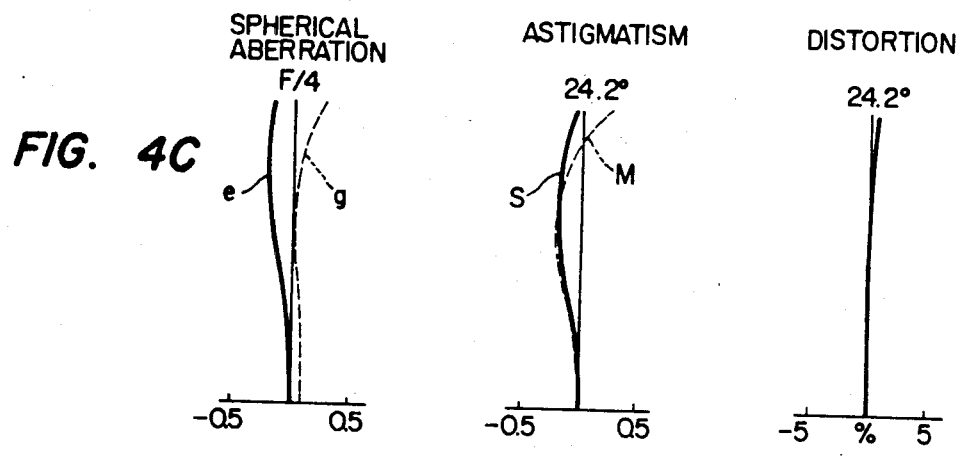
Figure 6A:
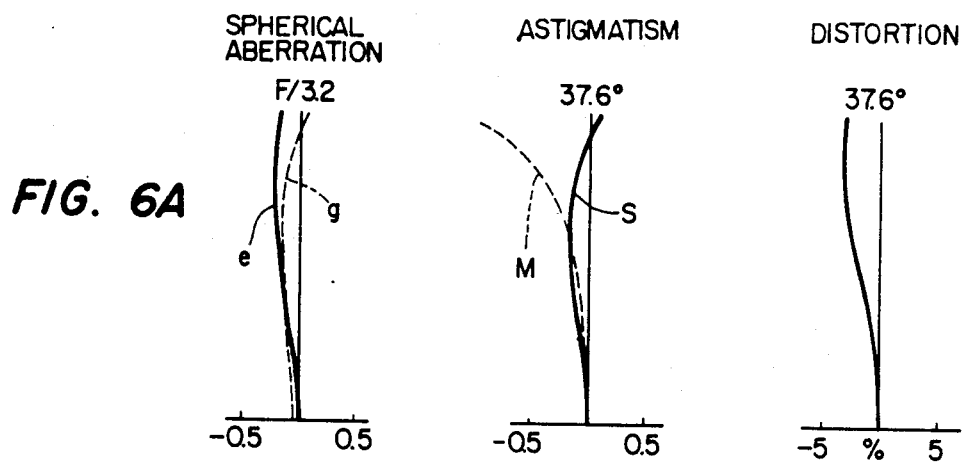
FIG. 6A, FIG. 6B and FIG. 6C show curves illustrating the aberration characteristics of a fifth embodiment of the present invention.
Figure 6B:
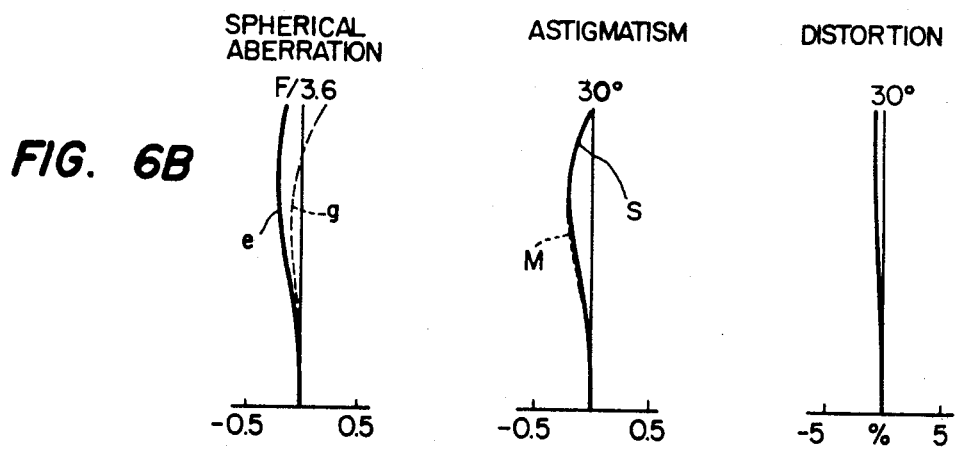
Figure 6C:
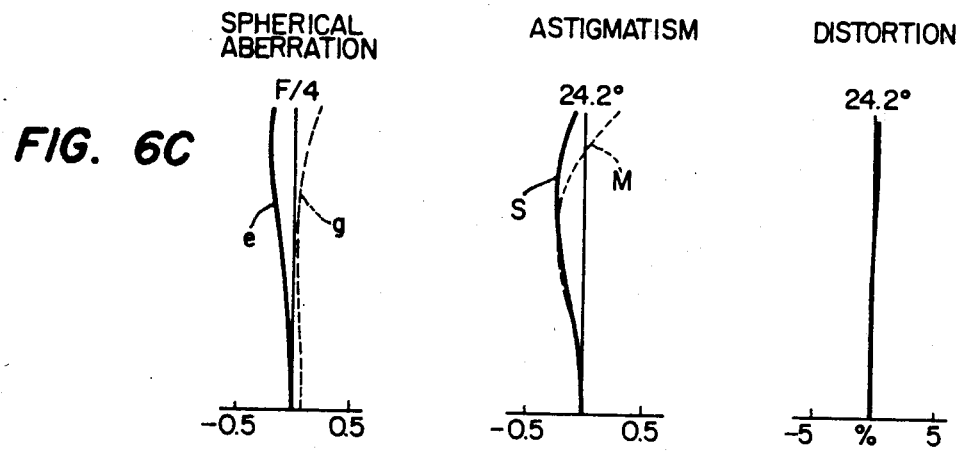
Figure 8A:
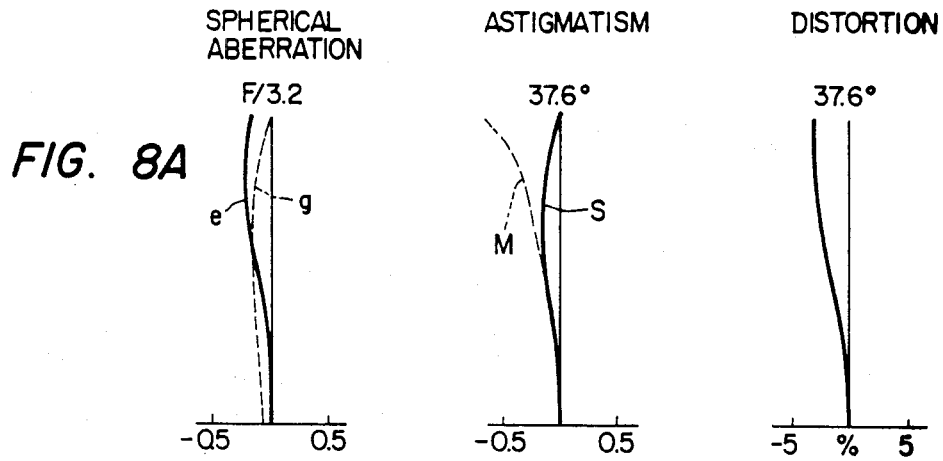
FIG. 8A, FIG. 8B and FIG. 8C show curves illustrating the aberration characteristics of a seventh embodiment of the present invention.
Figure 8B:
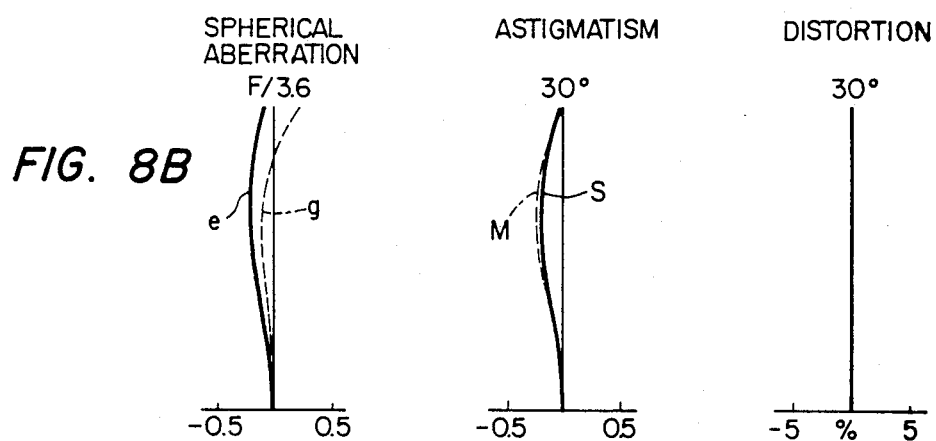
Figure 8C:
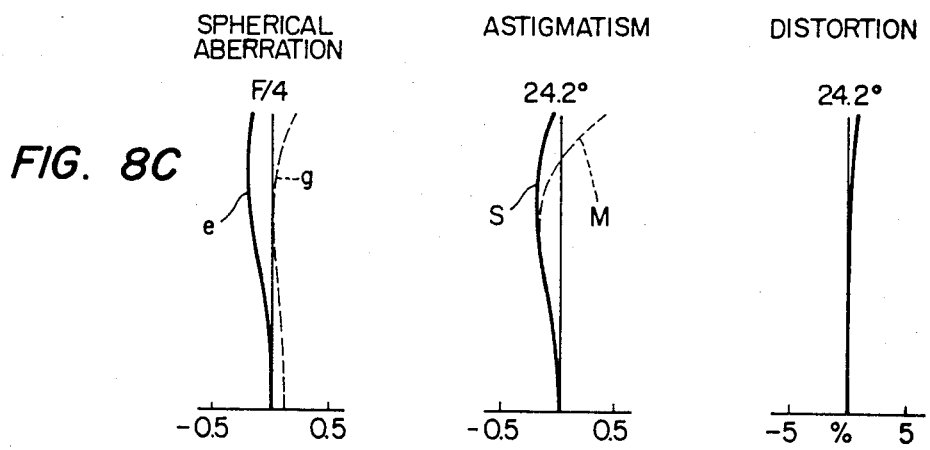

Out of the curves illustrating the aberration characteristics of the above-mentioned embodiments of the present invention, FIG. 2A, FIG. 3A, FIG. 4A, FIG. 5A, FIG. 6A, FIG. 7A and FIG. 8A visualize aberrations at the wide position, FIG. 2B, FIG. 3B, FIG. 4B, FIG. 5B, FIG. 6B, FIG. 7B and FIG. 8B visualize the aberrations at an intermediate field angle, and FIG. 2C, FIG. 3C, FIG. 4C, FIG. 5C, FIG. 6C, FIG. 7C and FIG. 8C visualize aberrations at the tele position.

I claim:

1. A zoom lens system comprising a front lens group consisting of a first positive lens component, a second negative meniscus lens component, a third negative lens component and a fourth positive lens component, and a rear lens group consisting of a fifth positive lens component, a sixth positive lens component, a seventh negative lens component and an eighth positive lens component, said zoom lens system being so designed as to perform zooming operation by varying the airspace reserved between said front and rear lens groups and to satisfy the following conditions (1) through (6):

$1.8 < r_1/|f_F| < 3.5$      (1)
$1.8 < r_3/|f_F| < 4.5$      (2)

$$0.03 < \left(\frac{1}{n_1} - \frac{1}{n_2} + \frac{1}{n_3}\right) /2 \qquad (3)$$

$1.75 < n_7$      (4)
$50 < (v_2 + v_3)/2$      (5)
$0.18 < (d_3 + d_4 + d_5)/|f_F| < 0.3$      (6)
$1.68 < n_4$      (7)
$3 < |r_8|/|f_F|$      (8)
$0.35 < (d_9 + d_{13})/f_R < 0.5$      (9)

wherein the reference symbol $r_1$ represents radius of curvature on the object side surface of said first lens component, the reference symbol $r_3$ designates radius of curvature on the object side surface of said second lens component, the reference symbol $r_8$ designates radius of curvature on the image side surface of said fourth lens component, the reference symbols $n_1$, $n_2$, $n_3$, $n_4$ and $n_7$ denote refractive indices of said first, second, third, fourth and seventh lens components respectively, the reference numerals $v_2$ and $v_3$ represent Abbe's numbers of said second and third lens components respectively, the reference symbols $d_3$ and $d_5$ designate thicknesses of said second and third lens components respectively, the reference symbol $d_4$ denotes said airspace reserved between said second and third lens components, the reference symbols $d_9$ and $d_{13}$ denote thicknesses of said fifth and seventh lens components respectively, the reference symbol $f_F$ represents focal length of said front lens group, and the reference symbol $f_R$ represents focal length of said rear lens group.

2. A zoom lens system according to claim 1 satisfying furthermore the following additional conditions (10) and (11):

$0.55 < |r_{16}|/f_R < 0.85$      (10)

-continued
$$1.6 < (n_5 + n_6 + n_8)/3 < 1.7 \tag{11}$$

wherein the reference symbol $r_{16}$ represents radius of curvature on the image side surface of said eighth lens component, and the reference symbols $n_5$, $n_6$ and $n_8$ designate refractive indices of said fifth, sixth and eighth lens components respectively.

3. A zoom lens system according to claim 1 having the following numerical data:

| | | |
|---|---|---|
| $r_1 = 127.858$ | | |
| $d_1 = 2.89$ | $n_1 = 1.51825$ | $\nu_1 = 64.15$ |
| $r_2 = -5305.436$ | | |
| $d_2 = 0.10$ | | |
| $r_3 = 133.964$ | | |
| $d_3 = 1.40$ | $n_2 = 1.64129$ | $\nu_2 = 55.38$ |
| $r_4 = 19.583$ | | |
| $d_4 = 8.06$ | | |
| $r_5 = -106.781$ | | |
| $d_5 = 2.45$ | $n_3 = 1.60548$ | $\nu_3 = 60.70$ |
| $r_6 = 43.081$ | | |
| $d_6 = 2.68$ | | |
| $r_7 = 37.460$ | | |
| $d_7 = 3.90$ | $n_4 = 1.81077$ | $\nu_4 = 40.95$ |
| $r_8 = 361.218$ | | |
| $d_8 = 1.04 \sim 23.69$ | | |
| $r_9 = 39.590$ | | |
| $d_9 = 8.40$ | $n_5 = 1.73234$ | $\nu_5 = 54.68$ |
| $r_{10} = -187.882$ | | |
| $d_{10} = 0.40$ | | |
| $r_{11} = 25.160$ | | |
| $d_{11} = 3.03$ | $n_6 = 1.61770$ | $\nu_6 = 51.17$ |
| $r_{12} = -797.384$ | | |
| $d_{12} = 3.01$ | | |
| $r_{13} = -46.421$ | | |
| $d_{13} = 7.62$ | $n_7 = 1.81265$ | $\nu_7 = 25.43$ |
| $r_{14} = 22.055$ | | |
| $d_{14} = 1.50$ | | |
| $r_{15} = 139.658$ | | |
| $d_{15} = 3.14$ | $n_8 = 1.67133$ | $\nu_8 = 41.93$ |
| $r_{16} = -24.057$ | | |
| $f = 28.09 \sim 48.06,\ \omega = 37.6° \sim 24.2°$ | | |
| $f_F = -47.368,\ f_R = 34.295$ | | |
| $r_1/|f_F| = 2.699,\ r_3/|f_F| = 2.828$ | | |

$$\frac{1}{n_1} - \left(\frac{1}{n_2} + \frac{1}{n_3}\right)/2 = 0.0426$$

$(\nu_2 + \nu_3)/2 = 58.04,\ (d_3 + d_4 + d_5)/|f_F| = 0.251$
$|r_8|/|f_F| = 7.626,\ (d_9 + d_{13})/f_R = 0.467$
$|r_{16}|/|f_R| = 0.702,\ (n_5 + n_6 + n_8)/3 = 1.67379$ wherein the reference sybmols $r_1$ through $r_{16}$ represent radii of curvature on the surfaces of the respective lens components, the reference symbols $d_1$ through $d_{15}$ designates thicknesses of the respective lens components and airspaces reserved therebetween, the reference symbols $n_1$ through $n_8$ denote refractive indices of the respective lens components, the reference symbols $\nu_1$ through $\nu_8$ represent Abbe's numbers of the respective lens components, the reference symbol f designates focal length of said zoom lens system as a whole, and the reference symbol $\omega$ denotes half field angle.

4. A zoom lens system according to claim 1 having the following numerical data:

| | | |
|---|---|---|
| $r_1 = 113.512$ | | |
| $d_1 = 3.50$ | $n_1 = 1.51825$ | $\nu_1 = 64.15$ |
| $r_2 = \infty$ | | |
| $d_2 = 0.10$ | | |
| $r_3 = 95.689$ | | |
| $d_3 = 1.46$ | $n_2 = 1.64368$ | $\nu_2 = 56.93$ |
| $r_4 = 17.951$ | | |
| $d_4 = 8.90$ | | |
| $r_5 = -70.316$ | | |
| $d_5 = 1.20$ | $n_3 = 1.73234$ | $\nu_3 = 54.68$ |
| $r_6 = 49.671$ | | |
| $d_6 = 1.63$ | | |
| $r_7 = 37.333$ | | |
| $d_7 = 4.50$ | $n_4 = 1.80401$ | $\nu_4 = 42.24$ |
| $r_8 = -229.690$ | | |
| $d_8 = 2.26 \sim 25.34$ | | |
| $r_9 = 46.763$ | | |
| $d_9 = 7.16$ | $n_5 = 1.61377$ | $\nu_5 = 55.92$ |
| $r_{10} = -57.086$ | | |
| $d_{10} = 0.40$ | | |
| $r_{11} = 20.230$ | | |
| $d_{11} = 2.75$ | $n_6 = 1.61770$ | $\nu_6 = 51.17$ |
| $r_{12} = 60.638$ | | |
| $d_{12} = 2.98$ | | |
| $r_{13} = -68.403$ | | |
| $d_{13} = 8.02$ | $n_7 = 1.79177$ | $\nu_7 = 26.22$ |
| $r_{14} = 20.304$ | | |
| $d_{14} = 2.14$ | | |
| $r_{15} = 100.850$ | | |
| $d_{15} = 3.47$ | $n_8 = 1.64268$ | $\nu_8 = 44.88$ |
| $r_{16} = -25.935$ | | |
| $f = 28.09 \sim 48.06,\ \omega = 37.6° \sim 24.2°$ | | |
| $f_F = -46.887,\ f_R = 34.828$ | | |
| $r_1/|f_F| = 2.421,\ r_3/|f_F| = 2.041$ | | |

$$\frac{1}{n_1} - \left(\frac{1}{n_2} + \frac{1}{n_3}\right)/2 = 0.0659,\ (\nu_2 + \nu_3)/2 = 55.81$$

$(d_3 + d_4 + d_5)/|f_F| = 0.247,\ |r_8|/|f_F| = 4.899$
$(d_9 + d_{13})/f_R = 0.436,\ |r_{16}|/|f_R| = 0.745$
$(n_5 + n_6 + n_8)/3 = 1.62472$ wherein the reference symbols $r_1$ through $r_{16}$ represent radii of curvature on the surfaces of the respective lens components, the reference symbols $d_1$ through $d_{15}$ designates thicknesses of the respective lens components and airspaces reserved therebetween, the reference symbols $n_1$ through $n_8$ denote refractive indices of the respective lens components, the reference symbols $\nu_1$ through $\nu_8$ represents Abbe's numbers of the respective lens components, the reference symbol f designates focal length of said zoom lens system as a whole, and the reference symbol $\omega$ denote half field angle.

5. A zoom lens system according to claim 1 having the following numerical data:

| | | |
|---|---|---|
| $r_1 = 100.042$ | | |
| $d_1 = 3.10$ | $n_1 = 1.51825$ | $\nu_1 = 64.15$ |
| $r_2 = 1906.586$ | | |
| $d_2 = 0.10$ | | |
| $r_3 = 108.871$ | | |
| $d_3 = 1.46$ | $n_2 = 1.73234$ | $\nu_2 = 54.68$ |
| $r_4 = 19.330$ | | |
| $d_4 = 8.52$ | | |
| $r_5 = -78.996$ | | |
| $d_5 = 1.20$ | $n_3 = 1.73234$ | $\nu_3 = 54.68$ |
| $r_6 = 52.609$ | | |
| $d_6 = 2.17$ | | |
| $r_7 = 40.258$ | | |
| $d_7 = 4.20$ | $n_4 = 1.81077$ | $\nu_4 = 40.95$ |
| $r_8 = -212.269$ | | |
| $d_8 = 0.91 \sim 24.21$ | | |
| $r_9 = 45.876$ | | |
| $d_9 = 7.79$ | $n_5 = 1.61377$ | $\nu_5 = 55.92$ |
| $r_{10} = -67.744$ | | |
| $d_{10} = 0.41$ | | |
| $r_{11} = 22.403$ | | |
| $d_{11} = 2.59$ | $n_6 = 1.61770$ | $\nu_6 = 51.17$ |
| $r_{12} = 118.006$ | | |
| $d_{12} = 3.23$ | | |
| $r_{13} = -59.260$ | | |
| $d_{13} = 8.49$ | $n_7 = 1.79177$ | $\nu_7 = 26.22$ |
| $r_{14} = 21.536$ | | |

-continued $d_{14} = 2.16$
$r_{15} = 250.069$
$d_{15} = 3.23$  $n_8 = 1.72372$  $\nu_8 = 46.03$
$r_{16} = -26.092$
$f = 28.09 \sim 48.06, \omega = 37.6° \sim 24.2°$
$f_F = -46.874, f_R = 35.192$
$r_1/|f_F| = 2.134, r_3/|f_F| = 2.323$ $\frac{1}{n_1} - \left(\frac{1}{n_2} + \frac{1}{n_3}\right) / 2 = 0.0814, (\nu_2 + \nu_3)/2 = 54.68$ $(d_3 + d_4 + d_5)/|f_F| = 0.238, |r_8|/|f_F| = 4.529$
$(d_9 + d_{13})/f_R = 0.462, |r_{16}|/f_R = 0.741$
$(n_5 + n_6 + n_8)/3 = 1.65173$ wherein the reference symbols $r_1$ through $r_{16}$ represent radii of curvature on the surfaces of the respective lens components, the reference symbols $d_1$ through $d_{15}$ designate thicknesses of the respective lens components and airspaces reserved therebetween, the reference symbols $n_1$ through $n_8$ denote refractive indices of the respective lens components, the reference symbols $\nu_1$ through $\nu_8$ represent Abbe's numbers of the respective lens components, the reference symbol f designates focal length of said zoom lens system as a whole, and the reference symbol $\omega$ denotes half field angle.

6. A zoom lens system according to claim 1 having the following numerical data:

| | | |
|---|---|---|
| $r_1 = 119.467$ | | |
| $d_1 = 3.00$ | $n_1 = 1.51825$ | $\nu_1 = 64.15$ |
| $r_2 = -1146.097$ | | |
| $d_2 = 0.10$ | | |
| $r_3 = 183.494$ | | |
| $d_3 = 1.48$ | $n_2 = 1.73234$ | $\nu_2 = 54.68$ |
| $r_4 = 19.785$ | | |
| $d_4 = 6.91$ | | |
| $r_5 = -118.630$ | | |
| $d_5 = 1.43$ | $n_3 = 1.64254$ | $\nu_3 = 60.09$ |
| $r_6 = 46.661$ | | |
| $d_6 = 2.42$ | | |
| $r_7 = 37.163$ | | |
| $d_7 = 3.9$ | $n_4 = 1.81077$ | $\nu_4 = 40.95$ |
| $r_8 = -1947.670$ | | |
| $d_8 = 0.54 \sim 23.36$ | | |
| $r_9 = 37.763$ | | |
| $d_9 = 9.18$ | $n_5 = 1.73234$ | $\nu_5 = 54.68$ |
| $r_{10} = -96.398$ | | |
| $d_{10} = 0.40$ | | |
| $r_{11} = 26.130$ | | |
| $d_{11} = 2.69$ | $n_6 = 1.61770$ | $\nu_6 = 51.17$ |
| $r_{12} = -515.202$ | | |
| $d_{12} = 2.39$ | | |
| $r_{13} = -39.463$ | | |
| $d_{13} = 7.33$ | $n_7 = 1.79177$ | $\nu_7 = 26.22$ |
| $r_{14} = 22.145$ | | |
| $d_{14} = 2.10$ | | |
| $r_{15} = -279.593$ | | |
| $d_{15} = 3.14$ | $n_8 = 1.67133$ | $\nu_8 = 41.93$ |
| $r_{16} = -20.941$ | | |
| $f = 28.09 \sim 48.06, \omega = 37.6° \sim 24.2°$ | | |
| $f_F = -47.411, f_R + 34.287$ | | |
| $r_1/|f_F| = 2.520, r_3/|f_F| = 3.870$ | | |

$\frac{1}{n_1} - \left(\frac{1}{n_2} + \frac{1}{n_3}\right) / 2 = 0.0656, (\nu_2 + \nu_3)/2 = 57.39$ $(d_3 + d_4 + d_5)/|f_F| = 0.207, |r_8|/|f_F| = 41.08$
$(d_9 + d_{13})/f_R = 0.481, |r_{16}|/f_R = 0.611$
$(n_5 + n_6 + n_8)/3 = 1.67379$ wherein the reference symbols $r_1$ through $r_{16}$ represent radii of curvature on the surfaces of the respective lens components, the reference symbols $d_1$ through $d_{15}$ designate thicknesses of the respective lens components and airspaces reserved therebetween, the reference symbols $n_1$ through $n_8$ denote refractive indices of the respective lens components, the reference symbols $\nu_1$ through $\nu_8$ represent Abbe's numbers of the respective lens components, the reference symbol f designates focal length of said zoom lens system as a whole, and the reference symbol $\omega$ denotes half field angle.

7. A zoom lens system according to claim 1 having the following numerical data:

| | | |
|---|---|---|
| $r_1 = 121.454$ | | |
| $d_1 = 3.50$ | $n_1 = 1.51825$ | $\nu_1 = 64.15$ |
| $r_2 = -861.816$ | | |
| $d_2 = 0.10$ | | |
| $r_3 = 107.246$ | | |
| $d_3 = 1.46$ | $n_2 = 1.64368$ | $\nu_2 = 56.93$ |
| $r_4 = 18.249$ | | |
| $d_4 = 9.42$ | | |
| $r_5 = -70.215$ | | |
| $d_5 = 1.20$ | $n_3 = 1.64368$ | $\nu_3 = 56.93$ |
| $r_6 = 42.396$ | | |
| $d_6 = 1.39$ | | |
| $r_7 = 35.023$ | $n_4 = 1.80401$ | $\nu_4 = 42.24$ |
| $d_7 = 4.50$ | | |
| $r_8 = -496.198$ | | |
| $d_8 = 160 \sim 24.60$ | | |
| $r_9 = 46.961$ | | |
| $d_9 = 6.30$ | $n_5 = 1.61377$ | $\nu_5 = 55.92$ |
| $r_{10} = -59.252$ | | |
| $d_{10} = 0.40$ | | |
| $r_{11} = 19.829$ | | |
| $d_{11} = 2.64$ | $n_6 = 1.61770$ | $\nu_6 = 51.17$ |
| $r_{12} = 53.772$ | | |
| $d_{12} = 3.28$ | | |
| $r_{13} = -69.625$ | | |
| $d_{13} = 7.85$ | $n_7 = 1.79177$ | $\nu_7 = 26.22$ |
| $r_{14} = 20.092$ | | |
| $d_{14} = 2.12$ | | |
| $r_{15} = 72.179$ | | |
| $d_{15} = 3.44$ | $n_8 = 1.64268$ | $\nu_8 = 44.88$ |
| $r_{16} = -26.476$ | | |
| $f = 28.09 \sim 48.06, \omega = 37.6 \sim 24.2$ | | |
| $f_F = -46.872, f_R = 34.828$ | | |
| $r_1/|f_F| = 2.591, r_3/|f_F| = 2.288$ | | |

$\frac{1}{n_1} - \left(\frac{1}{n_2} + \frac{1}{n_3}\right) / 2 = 0.0503, (\nu_2 + \nu_3)/2 = 56.93$ $(d_3 + d_4 + d_5)/|f_F| = 0.258, |r_8|/|f_F| = 10.586$
$(d_9 + d_{13})/f_R = 0.41, |r_6|/f_R = 0.76$
$(n_5 + n_6 + n_8)/3 = 1.62472$ wherein the reference symbols $r_1$ through $r_{16}$ represent radii of curvature on the surfaces of the respective lens components, the reference symbols $d_1$ through $d_{15}$ designate thicknesses of the respective lens components and airspaces reserved therebetween, the reference symbols $n_1$ through $n_8$ denote refractive indices of the respective lens components, the reference symbols $\nu_1$ through $\nu_8$ represent Abbe's numbers of the respective lens components, the reference symbol f designates focal length of said zoom lens system as a whole, and the reference symbol $\omega$ denotes half field angle.

8. A zoom lens system according to claim 1 having the following numerical data:

| | | |
|---|---|---|
| $r_1 = 144.789$ | | |
| $d_1 = 3.00$ | $n_1 = 1.51825$ | $\nu_1 = 64.15$ |
| $r_2 = 2330.391$ | | |
| $d_2 = 0.10$ | | |
| $r_3 = 110.076$ | | |
| $d_3 = 1.48$ | $n_2 = 1.73234$ | $\nu_2 = 54.68$ |

-continued $r_4 = 19.245$
$d_4 = 7.10$
$r_5 = -75.558$
$d_5 = 1.90$  $n_3 = 1.73234$  $\nu_3 = 54.68$
$r_6 = 105.490$
$d_6 = 2.51$
$r_7 = 42.547$
$d_7 = 3.90$  $n_4 = 1.70559$  $\nu_4 = 41.10$
$r_8 = -243.568$
$d_8 = 0.79 \sim 23.61$
$r_9 = 32.265$
$d_9 = 7.97$  $n_5 = 1.66123$  $\nu_5 = 53.44$
$r_{10} = -66.369$
$d_{10} = 0.40$
$r_{11} = 22.928$
$d_{11} = 2.49$  $n_6 = 1.61770$  $\nu_6 = 51.17$
$r_{12} = 100.148$
$d_{12} = 2.65$
$r_{13} = -41.462$
$d_{13} = 6.37$  $n_7 = 1.79177$  $\nu_7 = 26.22$
$r_{14} = 20.801$
$d_{14} = 2.10$
$r_{15} = -262.716$
$d_{15} = 3.14$  $n_8 = 1.67133$  $\nu_8 = 41.93$
$r_{16} = -20.839$
$f = 28.09 \sim 48.06, \omega = 37.6° \sim 24.2°$
$f_F = -47.368, f_R = 34.294$
$r_1/|f_F| = 3.057, r_3/|f_F| = 2.324$ $$\frac{1}{n_1} - \left(\frac{1}{n_2} + \frac{1}{n_3}\right)/2 = 0.0814, (\nu_2 + \nu_3)/2 = 54.68$$

$(d_3 + d_4 + d_5)/|f_F| = 0.221, |r_8|/|f_F| = 5.142$
$(d_9 + d_{13})/f_R = 0.418, |r_{16}|/f_R = 0.608$
$(n_5 + n_6 + n_8)/3 = 1.65009$ wherein the reference symbols $r_1$ through $r_{16}$ represent radii of curvature on the surfaces of the respective lens components, the reference symbols $d_1$ through $d_{15}$ designate thicknesses of the respective lens components and airspaces reserved therebetween, the reference symbols $n_1$ through $n_8$ denote refractive indices of the respective lens components, the reference symbols $\nu_1$ through $\nu_8$ represent Abbe's numbers of the respective lens components, the reference symbol f designates focal length of said zoom lens system as a whole, and the reference symbol $\omega$ denotes half field angle.

9. A zoom lens system according to claim 1 having the following numerical data:

$r_1 = 105.685$
$d_1 = 3.47$  $n_1 = 1.51825$  $\nu_1 = 64.15$
$r_2 = 5283.200$
$d_2 = 0.10$
$r_3 = 100.244$
$d_3 = 1.70$  $n_2 = 1.68082$  $\nu_2 = 55.33$
$r_4 = 17.968$
$d_4 = 8.90$
$r_5 = -64.869$
$d_5 = 1.70$  $n_3 = 1.68082$  $\nu_3 = 55.33$
$r_6 = 57.540$
$d_6 = 1.28$
$r_7 = 37.798$
$d_7 = 4.44$  $n_4 = 1.80401$  $\nu_4 = 42.24$
$r_8 = -323.157$
$d_8 = 1.11 \sim 23.56$
$r_9 = 45.023$
$d_9 = 7.79$  $n_5 = 1.61634$  $\nu_5 = 56.36$
$r_{10} = -60.844$
$d_{10} = 0.39$
$r_{11} = 20.282$
$d_{11} = 2.64$  $n_6 = 1.61022$  $\nu_6 = 49.29$
$r_{12} = 73.663$
$d_{12} = 3.13$
$r_{13} = -66.564$
$d_{13} = 7.33$  $n_7 = 1.79177$  $\nu_7 = 26.22$
$r_{14} = 20.131$
$d_{14} = 2.10$
$r_{15} = 126.961$
$d_{15} = 3.37$  $n_8 = 1.68613$  $\nu_8 = 44.65$
$r_{16} = -26.715$
$f = 28.09 \sim 48.06, \omega = 37.6° \sim 24.2°$
$f_F = -46.404, f_R = 34.134$
$r_1/|f_F| = 2.277\ r_3/|f_F| = 2.160$ $$\frac{1}{n_1} - \left(\frac{1}{n_2} + \frac{1}{n_3}\right)/2 = 0.0637, (\nu_2 + \nu_3)/2 = 55.33$$

$(d_3 + d_4 + d_5)/|f_F| = 0.265, |r_8|/|f_F| = 6.964$
$(d_9 + d_{13})/f_R = 0.443\ |r_{16}|/f_R = 0.783$
$(n_5 + n_6 + n_8)/3 = 1.63756$ wherein the reference symbols $r_1$ through $r_{16}$ represent radii of curvature on the surfaces of the respective lens components, the reference symbols $d_1$ through $d_{15}$ designate thicknesses of the respective lens components and airspaces reserved therebetween, the reference symbols $n_1$ through $n_8$ denote refractive indices of the respective lens components, the reference symbols $\nu_1$ through $\nu_8$ represent Abbe's numbers of the respective lens components, the reference symbol f designates focal length of said zoom lens system as a whole, and the reference symbol $\omega$ denotes half field angle.

* * * * *